US009355186B2

(12) United States Patent
Khanna et al.

(10) Patent No.: US 9,355,186 B2
(45) Date of Patent: May 31, 2016

(54) LAUNCHING APPLICATIONS FROM WEBPAGES

(71) Applicant: Google Inc, Mountain View, CA (US)

(72) Inventors: Amit Khanna, Sunnyvale, CA (US); Linus Chou, San Francisco, CA (US)

(73) Assignee: Google Inc., Mountain View, CA (US)

( * ) Notice: Subject to any disclaimer, the term of this patent is extended or adjusted under 35 U.S.C. 154(b) by 561 days.

(21) Appl. No.: 13/665,700

(22) Filed: Oct. 31, 2012

(65) Prior Publication Data

US 2013/0111328 A1 May 2, 2013

Related U.S. Application Data

(60) Provisional application No. 61/554,310, filed on Nov. 1, 2011.

(51) Int. Cl.
G06F 17/30 (2006.01)

(52) U.S. Cl.
CPC ...... *G06F 17/30893* (2013.01); *G06F 17/3089* (2013.01)

(58) Field of Classification Search
CPC ............................................. H04W 4/00–4/26
See application file for complete search history.

(56) References Cited

U.S. PATENT DOCUMENTS

| | | | |
|---|---|---|---|
| 2005/0278651 A1* | 12/2005 | Coe et al. ....................... 715/779 |
| 2008/0134049 A1* | 6/2008 | Gupta et al. ................... 715/738 |
| 2008/0249945 A1 | 10/2008 | Lyman et al. |
| 2008/0267117 A1* | 10/2008 | Stern ............................. 370/329 |
| 2009/0183151 A1 | 7/2009 | Gharabally et al. |
| 2009/0228346 A1* | 9/2009 | Hu et al. ......................... 705/10 |
| 2009/0307105 A1 | 12/2009 | Lemay et al. |
| 2009/0307682 A1 | 12/2009 | Gharabally et al. |
| 2010/0229045 A1* | 9/2010 | Schultz et al. .................. 714/37 |
| 2011/0087725 A9* | 4/2011 | Neil et al. ...................... 709/203 |
| 2011/0314004 A1* | 12/2011 | Mehta ............................ 707/723 |
| 2012/0036003 A1* | 2/2012 | Tong et al. ................. 705/14.39 |
| 2012/0054167 A1* | 3/2012 | Chi et al. ....................... 707/706 |

(Continued)

OTHER PUBLICATIONS

Stackoverflow, "Launch custom android application from android browser", retrieved from https://web.archive.org/web/20100613012150/http://stackoverflow.com/questions/2958701/launch-custom-android-application-from-android-browser.*

"Stackoverflow: appspot.com url shows up in google search results instead of custom domain name", referred to as StackRef in the Office Action, retrieved from http://stackoverflow.com/questions/7315003/appspot-com-url-shows-up-in-google-search-results-instead-of-custom-domain-name.*

(Continued)

*Primary Examiner* — Stephen Hong
*Assistant Examiner* — Sanchita Roy
(74) *Attorney, Agent, or Firm* — John D. Lanza; Foley & Lardner LLP

(57) ABSTRACT

This specification describes technologies relating to launching applications from content items in webpages. In general, one aspect of the subject matter described in this specification can be embodied in methods that include receiving a content item including a first data element that identifies an application and a second data element that identifies a product. The methods may further include displaying the content item, receiving a user selection of the content item, and, in response, automatically checking if the application is installed on a user device. The methods may further include transmitting a request, including the first data element, to a server and installing the application identified by the first data element on the user device. The methods may further include launching the application with the second data element as an input so that the first content displayed by the application relates to the product.

63 Claims, 7 Drawing Sheets

(56) References Cited

U.S. PATENT DOCUMENTS

| | | | | |
|---|---|---|---|---|
| 2012/0173345 | A1* | 7/2012 | Yanefski et al. | 705/14.73 |
| 2012/0284247 | A1* | 11/2012 | Jiang et al. | 707/706 |
| 2012/0323898 | A1* | 12/2012 | Kumar | G06F 17/30867 707/723 |
| 2014/0207869 | A1* | 7/2014 | Savolainen | 709/204 |

OTHER PUBLICATIONS

Vogel, Lars "*Android Intents—Tutorial*", Version 3.0; www.vogella.com/articles/AndroidIntent/article.html; Jul. 20, 2010; 15 pages.

International Search Report and Written Opinion for International application No. PCT/US2012/062786 mailed Mar. 28, 2013; 8 pages.

\* cited by examiner

LAUNCHING APPLICATIONS FROM WEBPAGES

CROSS-REFERENCE TO RELATED APPLICATION

Priority is hereby claimed to U.S. Provisional Application No. 61/554,310, which was filed on Nov. 1, 2011. The contents of U.S. Provisional Application No. 61/554,310 are hereby incorporated by reference into this disclosure in their entirety.

TECHNICAL FIELD

The present disclosure relates to launching applications from content items in web pages.

BACKGROUND

The Internet provides access to a wide variety of resources. For example, video and/or audio files, as well as web pages for particular subjects or particular news articles, are accessible over the Internet. Access to these resources presents opportunities for content items (e.g., advertisements) to be provided with the resources. The pairing of content items with requested resources can generate value. For example, a web page can include content slots in which advertisements or other content items can be presented. These content slots can be defined in the web page or defined for presentation with a web page, for example, in a pop-up window. Paired online content may include a link to a landing page with additional information thought to be of interest to a user.

Applications for mobile devices are often available for download from application vendors that run maintain servers for this purpose.

SUMMARY

This specification describes technologies relating to launching applications from content item in a webpage. In general, one aspect of the subject matter described in this specification can be embodied in a method that includes receiving a content item that includes a first data element that identifies an application and a second data element that identifies a product. The method may further include displaying the content item and receiving a user selection of the content item. The method may further include, in response to receiving the user selection, automatically checking if the application is installed on a user device. The method may further include transmitting a request to a server, wherein the request includes the first data element, and installing the application identified by the first data element on the user device. The method may further include launching the application with the second data element as an input so that the first content displayed by the application relates to the product.

In general, one aspect of the subject matter described in this specification can be embodied in a method that includes transmitting a content item including a first data element that identifies an application, a second data element that identifies a product, and a set of instructions. The set of instructions, when executed by a user device in response to user selection of the content item, cause the processing device to perform operations including automatically checking if the application is installed on the user device and launching the application with the second data element as an input so that the first content displayed by the application relates to the product.

The set of instructions may be a script. The operations may further include transmitting conversion tracking information.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including receiving a content item that includes a first data element that identifies an application and a second data element that identifies a product. The operations may further include displaying the content item and receiving a user selection of the content item. The operations may further include, in response to receiving the user selection, automatically checking if the application is installed on a user device. The operations may further include transmitting a request to a server, wherein the request includes the first data element, and installing the application identified by the first data element on the user device. The operations may further include launching the application with the second data element as an input so that the first content displayed by the application relates to the product.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including transmitting a content item including a first data element that identifies an application, a second data element that identifies a product, and a set of instructions. The set of instructions, when executed by a user device in response to user selection of the content item, cause the processing device to perform operations including automatically checking if the application is installed on the user device and launching the application with the second data element as an input so that the first content displayed by the application relates to the product. The set of instructions may be a script. The operations may further include transmitting conversion tracking information.

In general, one aspect of the subject matter described in this specification can be embodied in a system that includes a network interface configured to receive a content item that includes a first data element that identifies an application and a second data element that identifies a product. The system may further include a display configured to display the content item. The system may further include a user interface configured to receive a user selection of the content item. The system may further include means for, in response to receiving the user selection, automatically checking if the application is installed. The system may further include a network interface configured to transmit a request to a server, wherein the request includes the first data element. The system may further include a module configured to install the application identified by the first data element. The system may further include means for launching the application with the second data element as an input so that the first content displayed by the application relates to the product.

In general, one aspect of the subject matter described in this specification can be embodied in a system that includes a network interface configured to transmit a content item including a first data element that identifies an application, a second data element that identifies a product, and a set of instructions. The set of instructions, when executed by a user device in response to user selection of the content item, cause the processing device to perform operations including automatically checking if the application is installed on the user device and launching the application with the second data element as an input so that the first content displayed by the application relates to the product. The set of instructions may be a script. The operations may further include transmitting conversion tracking information.

In general, one aspect of the subject matter described in this specification can be embodied in a mobile device that includes a wireless network interface configured to receive a content item that includes a first data element that identifies an application and a second data element that identifies a product. The system may further include a display configured to a present the content item. The system may further include a user interface configured to receive a user selection of the content item. The system may further include means for, in response to receiving the user selection, automatically checking if the application is installed. The system may further include a wireless network interface configured to transmit a request to a server, wherein the request includes the first data element. The system may further include means for launching the application with the second data element as an input so that the first content displayed by the application relates to the product.

In general, one aspect of the subject matter described in this specification can be embodied in a computer readable storage media storing software including instructions executable by a processing device that upon such execution cause the processing device to perform operations that include receiving a content item that includes a first data element that identifies an application and a second data element that identifies a product. The operations may further include displaying the content item and receiving a user selection of the content item. The operations may further include, in response to receiving the user selection, automatically checking if the application is installed on a user device. The operations may further include transmitting a request to a server, wherein the request includes the first data element, and installing the application identified by the first data element on the user device. The operations may further include launching the application with the second data element as an input so that the first content displayed by the application relates to the product.

In general, one aspect of the subject matter described in this specification can be embodied in a computer readable storage media storing software including instructions executable by a processing device that upon such execution cause the processing device to perform operations that include transmitting a content item including a first data element that identifies an application, a second data element that identifies a product, and a set of instructions. The set of instructions, when executed by a user device in response to user selection of the content item, cause the processing device to perform operations including automatically checking if the application is installed on the user device and launching the application with the second data element as an input so that the first content displayed by the application relates to the product. The set of instructions may be a script. The operations may further include transmitting conversion tracking information.

These and other embodiments can each optionally include one or more of the following features. A purchase transaction for the product may be completed using the application. Conversion tracking information may be transmitted. The content item may include an address for a server that maintains a conversion log. The content item may include a third data element that identifies a minimum version for the application. A check may be performed to determine if an installed version of the application is older than the minimum version for the application. The second data element may be stored in a message queue for applications until the application is launched. The server may provide download of applications. The server may redirect the request to a second server that provides download of applications. The application may be automatically launched after installation. Icons for a plurality of applications that are configured to process the second data element may be displayed and a user selection of the application may be received. Applications not matching the first data element may be prevented from processing the second data element.

Particular embodiments of the invention can be implemented to realize none, one or more of the following advantages. Some implementations may facilitate purchase of products associated with content items by deep-linking from the content item in a webpage directly to related content presented in a specialized application adapted to facilitate purchase transactions. Some implementations may enhance user experience by streamlining the process of finding and purchasing products. Some implementations may facilitate brand promotion for advertisers by linking an advertiser's specialized application to products that users are interested in and encouraging users to adopt the advertiser's online shopping application. Users of an advertiser's application may be more likely to make future purchases from the advertiser, rather than competitors. Some implementations may help to increase the install base for an advertiser's application.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Many mobile applications allow users to make purchases from within the application. For example, users may purchase books through a BookStore App or a camera through a Shopping App. It may be difficult to directly promote the adoption of these applications because the products they sell rather than the applications themselves may be the primary driver of user interest. Allowing publishers or advertisers to create content items that deep-link directly to the content within their applications may lead to better user-experience as well as create opportunities for the publisher to drive more business.

For example, a user may use a device (e.g. a mobile device) to search for a product. A user search query for a camera may result in a content item (e.g. an advertisement) that is included in a search result webpage. The content item may include data elements that allow for a deep-link into the camera section of a Shopping App associated with the content item. Similarly, content items on a webpage about a book review should be able to deep-link into the specific section about the book in the BookStore App.

Data elements identifying a product of interest may be passed into an application when it is launched to facilitate this deep-linking. A user device may be configured to handle the case where an application specified by a content item is not installed on the device. When a user selects (e.g., clicks on) the content item, if the application is installed, the application may be launched with the associated product related data elements as inputs so that the content (e.g., a landing page) related to the product is displayed in the application. If the application is not currently installed, a user may be presented with a download screen for the application served from an application vendor system. With user authorization, the application may be downloaded and installed on a user device. When the installation is complete, the application may be launched with the deep-link information.

In some implementations, instructions (e.g., a JavaScript script) for checking whether a designated application is installed and launching the application may be included in the content item.

A content item is any data that can be provided over a network. For example, an advertisement, including a link to a landing page is a content item.

Deep-linking is making a hyperlink that points to a specific content (e.g., a webpage or image) on a destination website, instead of that website's main or home page. Such links may be called deep-links. For example, an online merchant's website may have a main or home page that welcomes visitors and helps them to find content or products of interest. A visitor may navigate to other webpages within the website that include content related to particular products. A link that directs a user to a webpage for a particular product on the merchant's website, without viewing the main or home page, is an example of a deep-link.

Figure 1:
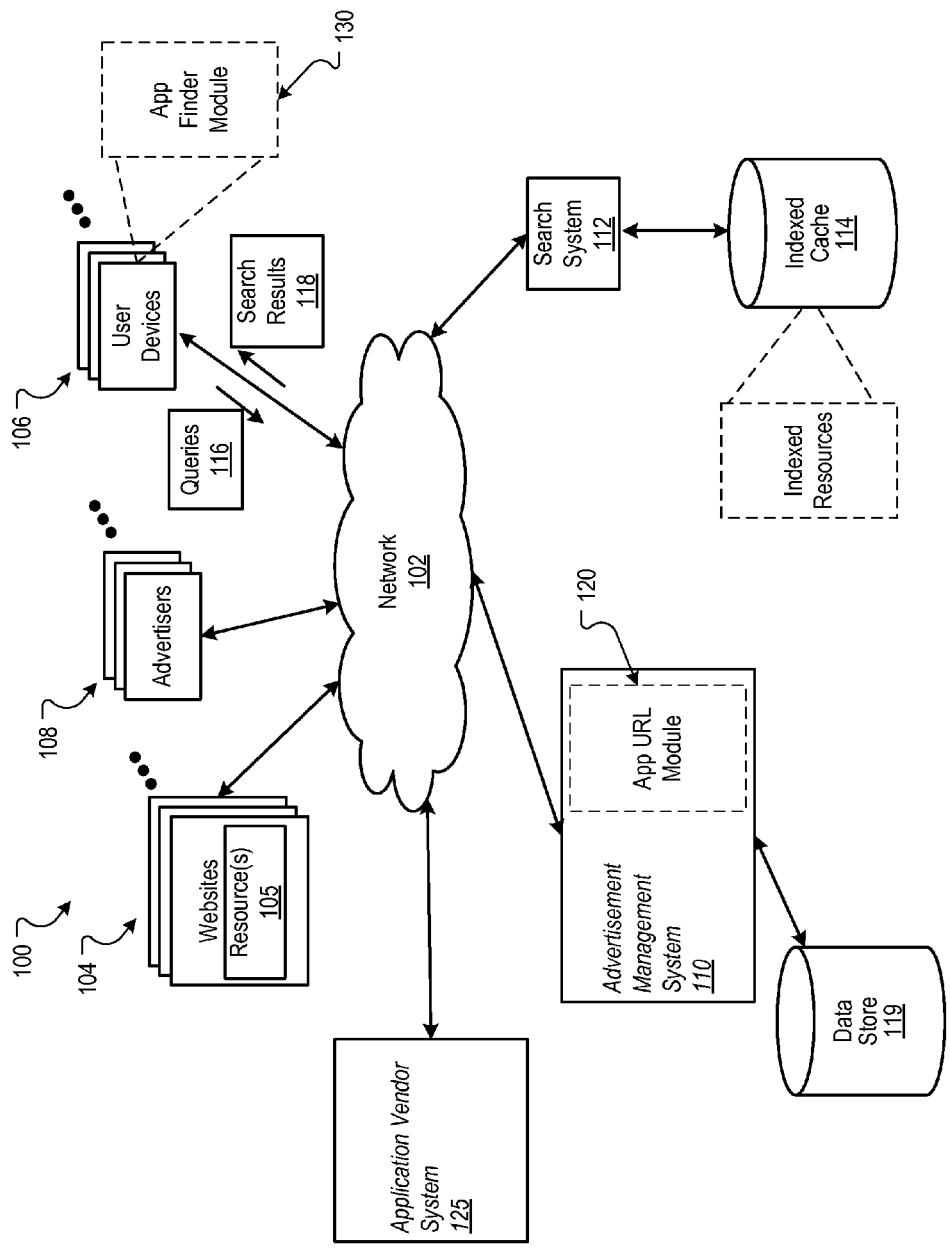
FIG. 1 is a block diagram of an example online environment.

FIG. 1 is a block diagram of an example online environment 100 in which user devices may use specialized applications to access online content (e.g., landing pages) associated with content items (e.g., advertisements). The example environment 100 includes a network 102, e.g., a local area network (LAN), wide area network (WAN), the Internet, or a combination thereof. The network 102 connects websites 104, user devices 106, content providers (e.g., advertisers 108), the advertisement management system 110. The example environment 100 may include many thousands of websites 104, user devices 106, and advertisers 108.

A website 104 includes one or more resources 105 associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that controls, manages and/or owns the website 104.

A resource 105 includes any data that can be provided over the network 102. A resource 105 is identified by a resource address that is associated with the resource 105. Resources include HTML pages, word processing documents, and portable document format (PDF) documents, images, video, and feed sources, to name only a few examples. The resources can include content, e.g., words, phrases, images and sounds that may include embedded information (e.g., meta-information in hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application (e.g., a web browser) to facilitate the sending and receiving of data over the network 102 and the presentation of content to a user.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements or other content can be presented. These specified portions of the resource or user display are referred to as advertisement slots or impressions.

To facilitate searching of these resources, the environment can include a search system 112 that identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements or other content can be presented.

When a resource 105 or search results 118 are requested by a user device 106, the advertisement management system 110 receives a request for additional content (e.g., advertisements) to be provided with the resource 105 or search results 118. The request for advertisements can include characteristics of the advertisement slots that are defined for the requested resource or search results page, and these requests are provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, keywords associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries 116.

The advertisement management system 110 can select from the eligible advertisements that are provided for presentation in advertisement slots of a resource or search results page based on results of an auction. For example, the advertisement management system 110 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPC bid. Alternatively, the bid can specify an amount that the advertiser is willing to pay for a selection (i.e., a click-through) of the advertisement or a conversion following selection of the advertisement. The highest bidders can be determined based on the bids alone, or based on the bids of each bidder being multiplied by one or more factors (e.g., quality scores derived from advertisement performance, landing page scores, and the like).

A conversion occurs when a user performs a particular action related to an advertisement provided with a resource or search results page. What constitutes a conversion may vary from case to case and can be determined in a variety of ways. For example, a conversion may occur when a user clicks on an advertisement and is referred to a landing page. Another conversion may occur when a user consummates a purchase before leaving that landing page or within a predetermined period of time (e.g., 30 days) after first visiting the landing page. A conversion can also be defined by an advertiser to be any measurable/observable user action. User actions may include, for example, downloading a white paper, navigating to at least a given depth of a website, viewing at least a certain number of web pages, spending at least a predetermined amount of time on a website or web page, registering on a website, etc. Other actions that constitute a conversion can also be used.

The advertisement management system may store and access data regarding past allocations of content items and user interactions in a data store 119. The data store 119 is a data store that stores data representing previous user interactions with publisher websites and advertisements. For example, in response to receiving a request for an advertisement, the advertisement management system 110 can store data identifying the website to which the request corresponds and identifying the request as an impression for the website. Additionally, the advertisement management system 110 can store data representing the advertisements that were provided in response to the request and any user actions (e.g., clicks or conversions) that are detected following presentation of the advertisements. The data store 119 may also store user session logs.

The advertisement management system 110 may also include an application URL module 120. The application URL module may be used to generate or modify a formatted URL for a content item. For example, the application URL module may receive a content item from an advertiser 108 that includes a URL for a landing page. The URL may be formatted and include data elements specifying a preferred application for viewing the landing page and aspects of a product or products associated with the content item. The application URL module may modify the URL by adding data elements related to conversion tracking. For example, the application URL module may add the URL for a conversion tracking server as a Common Gateway Interface (CGI) parameter. The application URL module 120 may transmit modified content items through a server system interface component of the advertisement management system 110. In some implementations, the application URL module may generate a deep-linking application specific landing page URL based on unformatted data elements associated with the content item received from an advertiser 108.

The online environment 100 may also include an application vendor system 125. The application vendor system may include one or more servers that offer applications for download. Some applications may be available free of charge, while other applications may require a purchase transaction prior to download. In some implementations, the application URL module 120 may modify an application specific landing page URL to include, as a CGI parameter, the URL for an application vendor system server that offers download of the application associated with a content item.

A user device 106 may include an application finder module 130. The application finder module may be used to check whether the user device has the application specified by a content item installed. If necessary, the application finder module may facilitate download of the application from the application vendor system 125 and installation of the application on the user device. The application finder module may further facilitate the launch of the application with input parameters that allow the application to automatically load content for a product associated with the content item.

The application finder module 130 may be implemented as software that is executed on a processing apparatus, such as the mobile device 300 illustrated in FIGS. 3-6.

Figure 7:
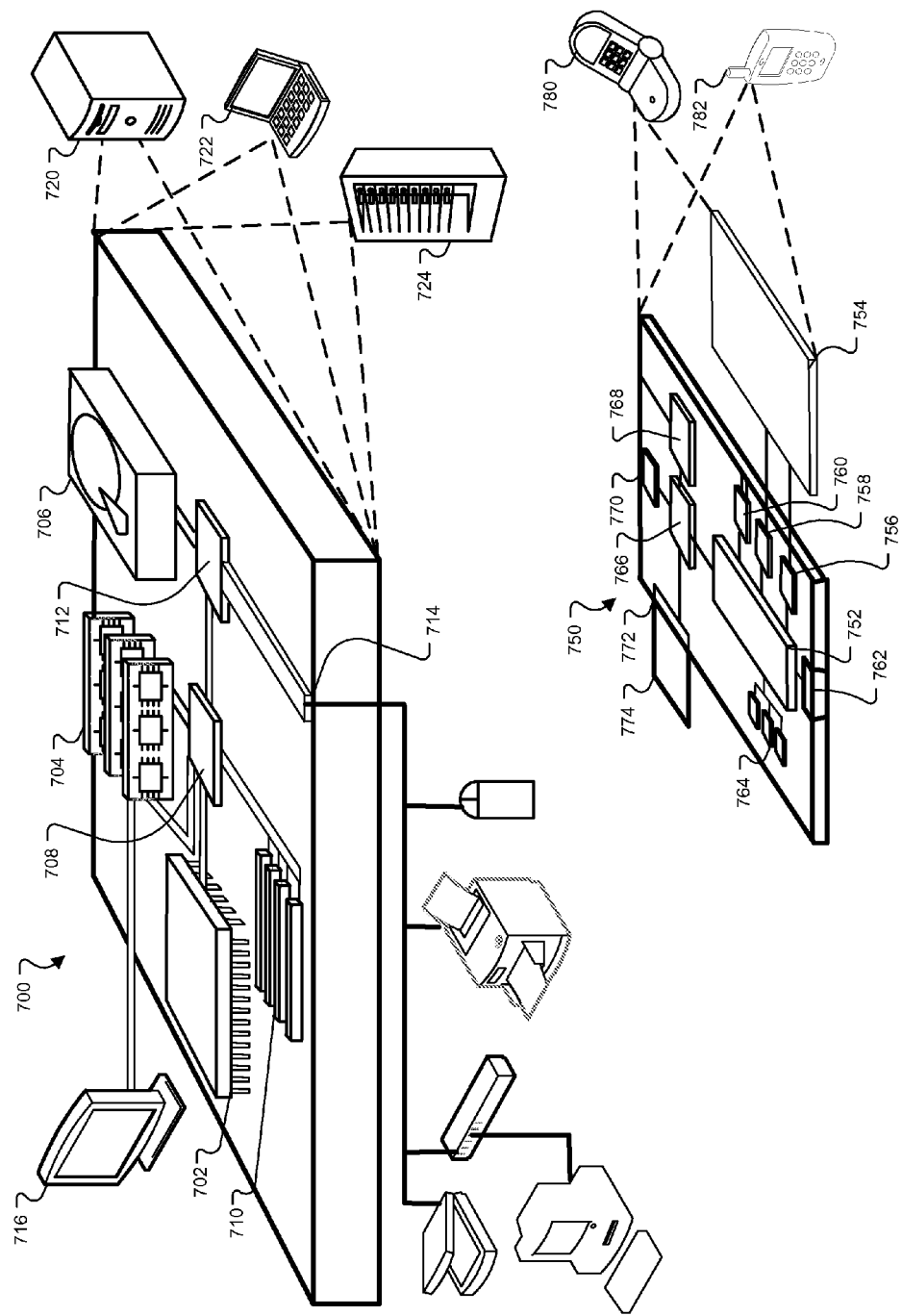
FIG. 7 shows an example of a computer device and a mobile computer device that can be used to implement the techniques described here.

The advertising management system 110 may be implemented as software that is executed on a processing apparatus, such as one or more computing devices (e.g., a computer system as illustrated in FIG. 7).

Figure 2:
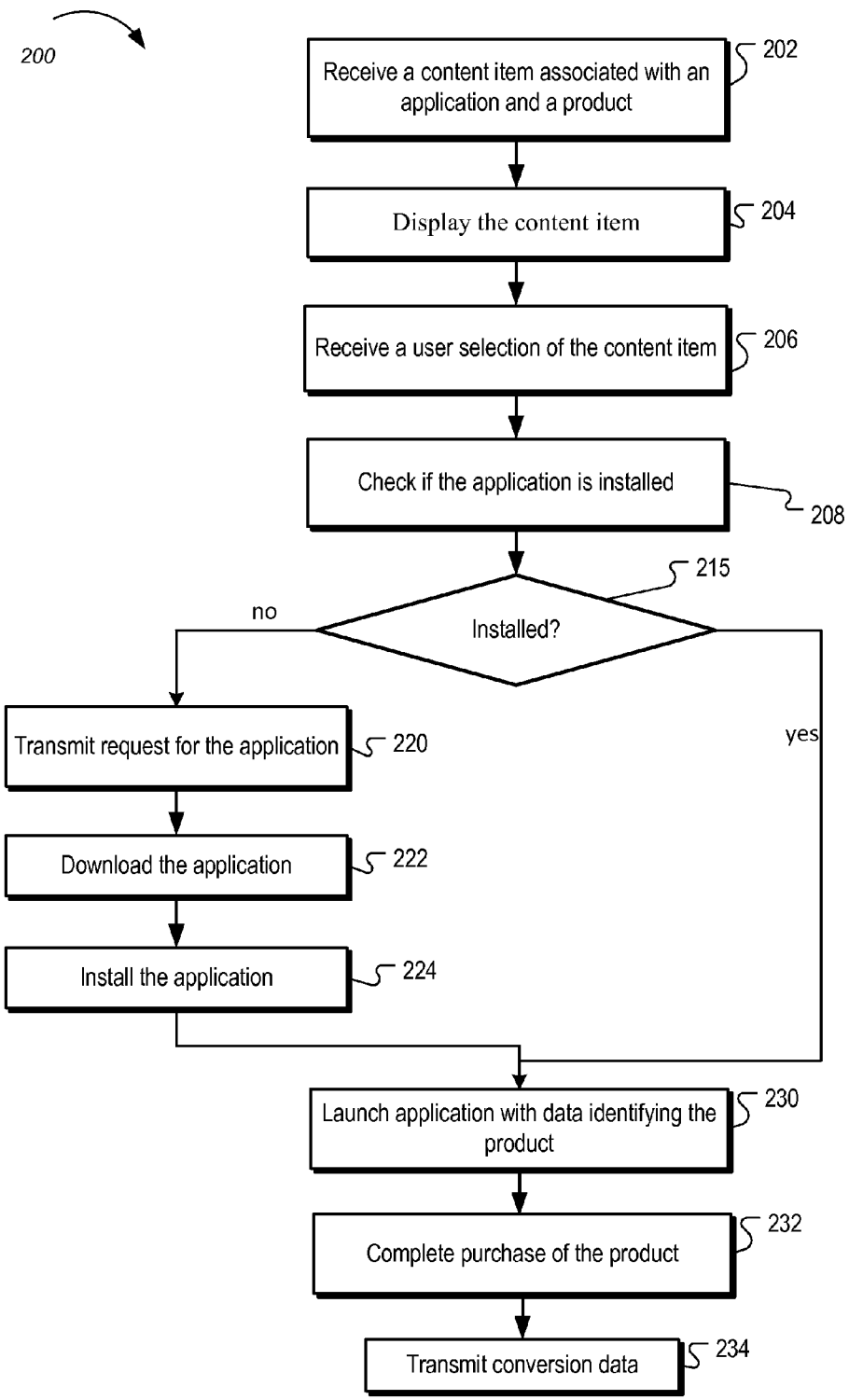
FIG. 2 is a flow chart of an example process for launching an application associated with a content item from a webpage.

FIG. 2 is a flow chart of an example process 200 for launching an application based on user selection of a content item in a webpage. The content item may designate a product and an application that may be used to review further information about the product. When a user selects the content item from a webpage, the designated application is launched with a reference to the designated product so that information related to the product is the first content displayed by the application. If the application is not already installed, the user is directed to a server that offers download of the application. After download and installation of the application, the application may be automatically launched with the reference to the product. The user may interact with this content through the application, possibly to purchase the product.

The process 200 may be implemented by an application finder module that is executed by a user's mobile computing device (e.g., illustrated in FIG. 7). For example, process 200 may be implemented by the App Finder 552 that is executed by the mobile device described in FIGS. 3-6.

A content item associated with an application and a product is received 202. For example, the content item may be an advertisement that includes a URL for a landing page with more information that may be of interest to a user. The URL may identify an application that may be used to view the contents of the landing page. The URL may further include one or more data elements specifying a product associated with the content item. In some implementations, the content item may further include a URL for a conversion tracking server (e.g., a component of advertisement management system 110). The conversion tracking server may maintain a log of conversions for content items. For example, a content item associated with a song available for download may include a URL in the format:

```
http://www.company.com/companyAppID/<artist_name>/
<album_name>/<song_name>?conversion_url=<url>
``` where www.company.com is a URL for an advertiser's webserver, the data element "companyAppID" is a sequence of alphanumeric characters that identifies an application, <artist_name>, <album_name>, and <song_name> are data elements that identify a product (e.g., a song), and conversion_url is a CGI parameter set to the value of <url>, which may be a URL of a conversion tracking server. In some implementations, the content item may further include a data element specifying a minimum version number for the application required to support the content of a designated landing page.

In some implementations, the content item may be generated in part by an advertiser 108 of FIG. 1. In some implementations, the content item may be generated in part and transmitted by the App URL module 120 of the advertisement management system 110 of FIG. 1.

The content may be received 202 by a user device 106 (e.g., a cell phone). The content item may be received via a network interface component of the user device. In some implementations, the content may be received 202 through a wireless network interface on a user device (e.g. antenna 305 illustrated in FIG. 3).

The content item is displayed 204 to a user. The content item may be processed, along with the rest of a webpage in which it is served, by a browser application (e.g., browser 551 illustrated in FIG. 5) running on a user device 106 of FIG. 1. The browser application may render an image based on the content item that may then be displayed on the display of a user device (e.g., display 301 illustrated in FIG. 3). For example, the content item may include a link that is labeled "View in Company App".

A user selection of the content item is received 206. A user may select the content item by using a user interface device (e.g., a keypad, a mouse, a j-mouse, or touchpad) on a user device. For example, a user may select the content item by clicking on a portion of display 301 using pointing device 304 of the mobile device 300 illustrated in FIG. 3.

A user device is checked 208 to determine if the application specified by the content item is installed. For example, a list of registered applications stored by the operating system on a user device is searched for value matching a data element in the content item that identifies an application. In some implementations, the version number of an installed application may be checked by comparing it to a minimum version number specified by a data element in the content item.

When the user selection is received, an application finder module 130 may be run on a user device 106 to process the data elements (e.g., URL components or parameters) associated with the content item and check 208 whether the specified application is installed. For example, application finder 552, illustrated in FIG. 5, may be run to check 208 whether the application associated with the content item is installed on mobile device 300.

If an adequate version of the application is not installed 215, a request for the application may be transmitted 220 to a remote server. For example, a request for the application may be transmitted by a user device 106 to a server for an application vendor system 125. In some implementations, the request may be transmitted 220 a server for an advertiser 108.

In some implementations, an advertiser server may redirect the request to a server for an application vendor system.

The request for the application may cause a remote server to respond by transmitting one or more webpages including an offer to download the application. A user may interact with one or more of these webpages to initiate a download 222 of the application. In some implementations, a download of the application may commence automatically using account information a user has previously registered with an application vendor system. In some implementations, a user may enter billing information through the webpages. In some implementations, a user may authorize a download operation by indicating agreement to terms.

The application may be installed 224 on the user device. For example, the application identified by the content item may be installed on the mobile device 300 that is illustrated in FIGS. 3-6.

After installation is complete, or if the application was previously installed 215, the application may be launched 230 with a data element identifying a product associated with the content item as an input parameter. For example, where the content item includes a URL with data elements that specify a song, the application may start up by loading a landing page provided by an advertiser's server that displays information regarding the song and an icon that when selected will allow the user to complete a purchase transaction that will result in the download of the song to the user's device.

In some implementations, one or more data elements identifying a product associated with the content item may be written to a message queue for applications that is maintained by an operating system on a user device. The message may include a unique identifier for the target application. When the application is launched, the application may check the message queue for messages targeted to it and retrieve the previously saved message. The application may decode one or more data elements identifying the product and accept them as input parameters. Based on these input parameters, the application may automatically load and display content (e.g., a specified landing page) associated with the identified product.

The application may be launched automatically when the application is determined to be previously installed. In some implementations, the application is launched automatically after the installation process completes. In some implementations, the launch may be initiated by user input (e.g., input received through pointing device 304). In some implementations, a user is presented with icons for multiple applications that may handle the landing page for the content item. For example, applications may be registered with the operating system for a user device in manner that indicates they handle URLs that match a certain pattern. The user may then select among the available applications. In some implementations, applications other than the designated application, i.e. that do not match the data element identifying an application for the content item, that are capable of processing the landing page may be suppressed. For example, the designated application may be automatically launched to process the landing page without presenting a user with a selection of available applications. In some implementations, the user may be presented with only a single option, the identified application, for handling the landing page. A user's permission may be requested to launch the application to view the linked content. For example, a user may be presented with a message: "This link is going to open Company App. Do you want to open this app? (Y/N)". The message may include a "make this the default behavior" option.

The application may be launched on a user device 106 (e.g., mobile device 300, illustrated in FIGS. 3-6). An application finder module 130 running on a user device 106 to may initiate the launch 230 of the specified application. For example, application finder 552, illustrated in FIG. 5, may launch 230 the application associated with the content item when the application is installed on mobile device 300. In some implementations, a user may initiate the launch of the application by a selection entered through user interface device (e.g., keyboard 302 or pointing device 304).

A user may use the application to further interact with content (e.g. a specified landing page) associated with the product and may choose to purchase 232 the product. The application may facilitate the purchase transaction. For example, the application may present the user with a "buy now" icon. If the user selects (e.g., with pointer device 304) the "buy now" icon, the user may be presented with webpages that may be used to complete a purchase transaction, e.g. by entering billing information and indicating assent to sales terms. In some implementations, billing information for a user may be preregistered so that manifesting assent by selecting the "buy now" icon is sufficient to complete the purchase transaction.

The application may transmit 234 conversion data to a server. The application may accept a data element specifying a conversion tracking server as an input parameter. For example, the application may accept the conversion_url as a CGI input parameter. When a purchase or other transaction is completed by the user, the application may transmit data reflecting the transaction to a designated conversion server (e.g., a server with a URL matching the value of the conversion_url data element).

In some implementations, instructions (e.g., a JavaScript script) for checking whether a designated application is installed and launching the application may be included in the content item. These instructions may be executed to implement portions of process 200 rather than relying on a preinstalled module in the user device configured to implement the process. The instructions may be executed by a browser (e.g., browser 551 of FIG. 5) application using runtime libraries (e.g., Core Java Libraries 531) on a user device. The instructions may cause the browser to automatically check if the application is installed on the user device. The instructions may further cause the application to be launched with a data element specifying a product associated with the content item as an input parameter so that the first content displayed by the application relates to the product. The instructions may cause a request for the application to be transmitted from the user device 106 to an application vendor system server 125. The instructions may cause the data reflecting a conversion to be transmitted from the user device to a conversion tracking server (e.g., a component of advertisement management system 110). The content item, including a data element specifying the application, a data element specifying the product, and the instructions may be transmitted from an advertisement management server 110 to a user device 106.

Figure 3:
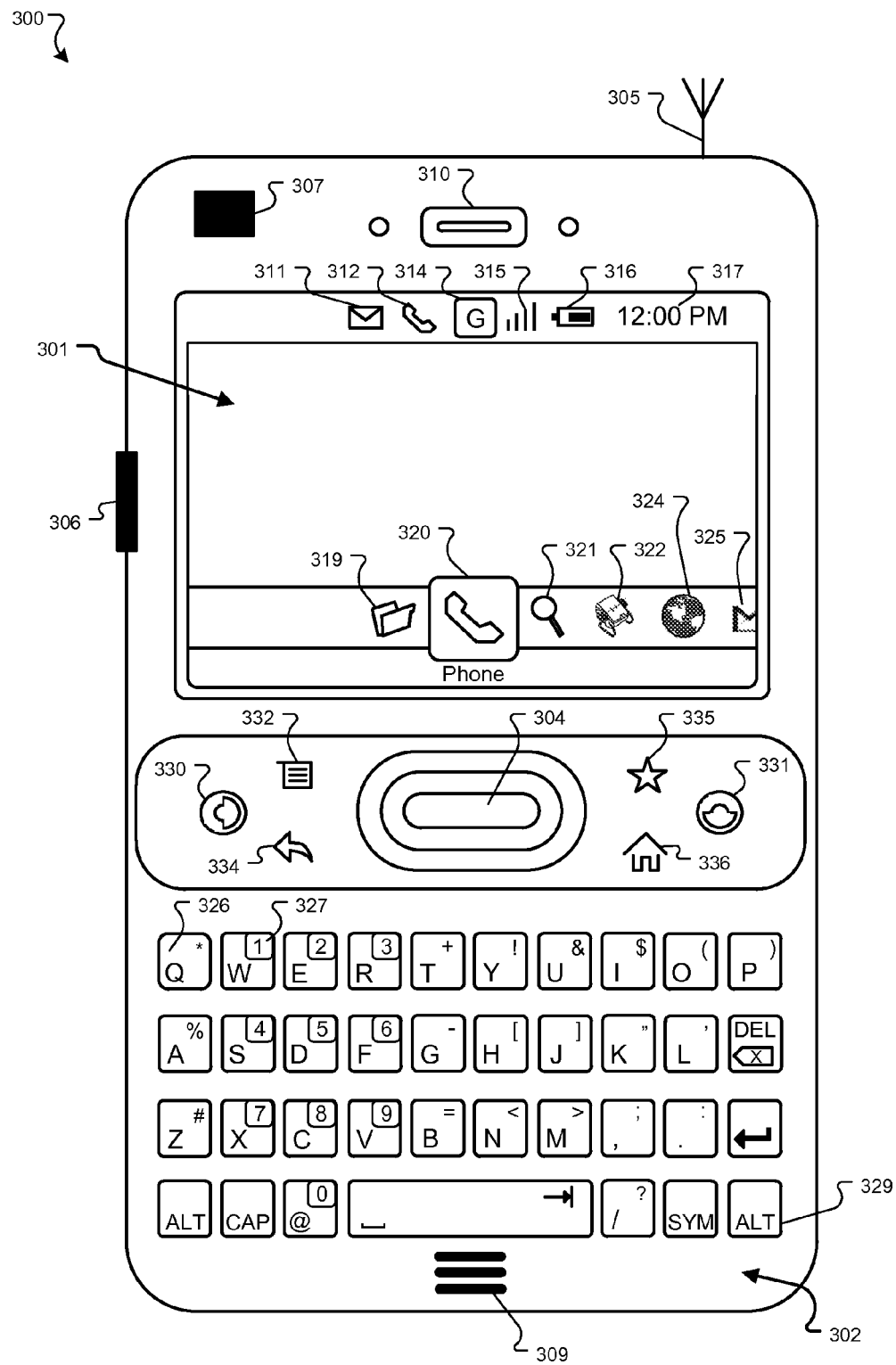
FIG. 3 is a schematic representation of an exemplary mobile device that implements embodiments of the application finder module described herein.

Referring now to FIG. 3, the exterior appearance of an exemplary mobile device 300 that implements application finder module 130 (shown in FIG. 1) is illustrated. Briefly, and among other things, the device 300 includes a processor configured to launch and, if necessary, install an application based on user selection of a content item in a webpage.

In more detail, the hardware environment of the device 300 includes a display 301 for displaying text, images, and video to a user; a keyboard 302 for entering text data and user commands into the device 300; a pointing device 304 for pointing, selecting, and adjusting objects displayed on the display 301; an antenna 305; a network connection 306; a camera 307; a microphone 309; and a speaker 310. Although the device 300 shows an external antenna 305, the device 300 can include an internal antenna, which is not visible to the user.

The display 301 can display video, graphics, images, and text that make up the user interface for the software applications used by the device 300, and the operating system programs used to operate the device 300. Among the possible elements that may be displayed on the display 301 are a new mail indicator 311 that alerts a user to the presence of a new message; an active call indicator 312 that indicates that a telephone call is being received, placed, or is occurring; a data standard indicator 314 that indicates the data standard currently being used by the device 300 to transmit and receive data; a signal strength indicator 315 that indicates a measurement of the strength of a signal received by via the antenna 305, such as by using signal strength bars; a battery life indicator 316 that indicates a measurement of the remaining battery life; or a clock 317 that outputs the current time.

The display 301 may also show application icons representing various applications available to the user, such as a web browser application icon 319, a phone application icon 320, a search application icon 321, a contacts application icon 322, a mapping application icon 324, an email application icon 325, or other application icons. In one example implementation, the display 301 is a quarter video graphics array (QVGA) thin film transistor (TFT) liquid crystal display (LCD), capable of 16-bit or better color.

A user uses the keyboard (or "keypad") 302 to enter commands and data to operate and control the operating system and applications. The keyboard 302 includes standard keyboard buttons or keys associated with alphanumeric characters, such as keys 326 and 327 that are associated with the alphanumeric characters "Q" and "W" when selected alone, or are associated with the characters "*" and "1" when pressed in combination with key 329. A single key may also be associated with special characters or functions, including unlabeled functions, based upon the state of the operating system or applications invoked by the operating system. For example, when an application calls for the input of a numeric character, a selection of the key 327 alone may cause a "1" to be input.

In addition to keys traditionally associated with an alphanumeric keypad, the keyboard 302 also includes other special function keys, such as an establish call key 330 that causes a received call to be answered or a new call to be originated; a terminate call key 331 that causes the termination of an active call; a drop down menu key 332 that causes a menu to appear within the display 301; a backward navigation key 334 that causes a previously accessed network address to be accessed again; a favorites key 335 that causes an active web page to be placed in a bookmarks folder of favorite sites, or causes a bookmarks folder to appear; a home page key 336 that causes an application invoked on the device 300 to navigate to a predetermined network address; or other keys that provide for multiple-way navigation, application selection, and power and volume control.

The user uses the pointing device 304 to select and adjust graphics and text objects displayed on the display 301 as part of the interaction with and control of the device 300 and the applications invoked on the device 300. The pointing device 304 is any appropriate type of pointing device, and may be a joystick, a trackball, a touch-pad, a camera, a voice input device, a touch screen device implemented in combination with the display 301, or any other input device.

The antenna 305, which can be an external antenna or an internal antenna, is a directional or omni-directional antenna used for the transmission and reception of radiofrequency (RF) signals that implement point-to-point radio communication, wireless local area network (LAN) communication, or location determination. The antenna 305 may facilitate point-to-point radio communication using the Specialized Mobile Radio (SMR), cellular, or Personal Communication Service (PCS) frequency bands, and may implement the transmission of data using any number or data standards. For example, the antenna 305 may allow data to be transmitted between the device 300 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with a QUALCOMM RTR6285™ transceiver and PM7540™ power management circuit.

The wireless or wired computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, an IEEE-1394 FIREWIRE connector, a Universal Serial Bus (USB) connector (including a mini-B USB interface connector), a serial port connector, a parallel port connector, or other wired connector. In another implementation, the functions of the network connection 306 and the antenna 305 are integrated into a single component.

The camera 307 allows the device 300 to capture digital images, and may be a scanner, a digital still camera, a digital video camera, or other digital input device. In one example implementation, the camera 307 is a 3 mega-pixel (MP) camera that utilizes a complementary metal-oxide semiconductor (CMOS).

The microphone 309 allows the device 300 to capture sound, and may be an omni-directional microphone, a unidirectional microphone, a bi-directional microphone, a shotgun microphone, or other type of apparatus that converts sound to an electrical signal. The microphone 309 may be used to capture sound generated by a user, for example when the user is speaking to another user during a telephone call via the device 300. Conversely, the speaker 310 allows the device to convert an electrical signal into sound, such as a voice from another user generated by a telephone application program, or a ring tone generated from a ring tone application program. Furthermore, although the device 300 is illustrated in FIG. 3 as a handheld device, in further implementations the device 300 may be a laptop, a workstation, a midrange computer, a mainframe, an embedded system, telephone, desktop PC, a tablet computer, a PDA, or other type of computing device.

Figure 4:
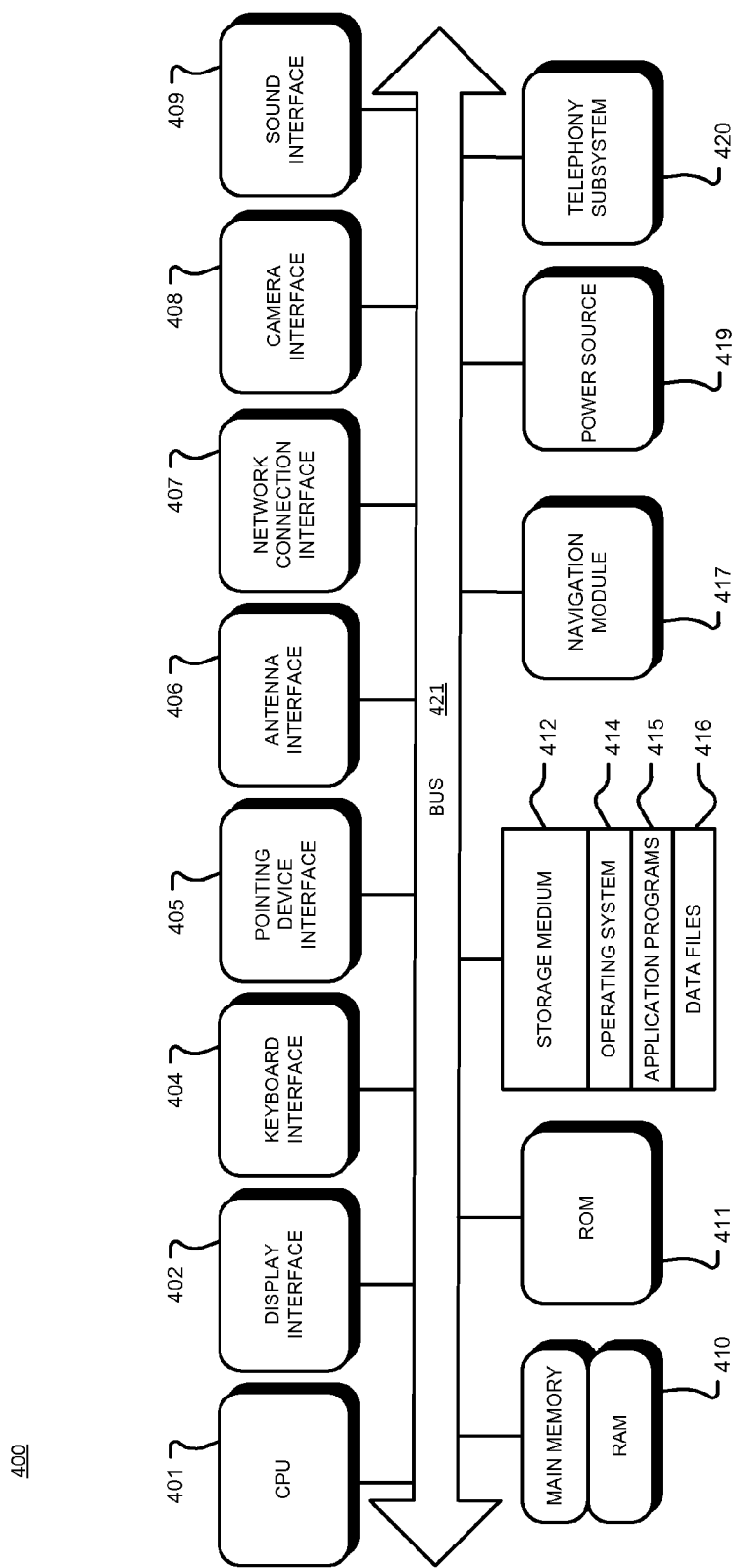
FIG. 4 is a block diagram illustrating the internal architecture of the device of FIG. 3.

FIG. 4 is a block diagram illustrating an internal architecture 400 of the device 300. The architecture includes a central processing unit (CPU) 401 where the computer instructions that comprise an operating system or an application are processed; a display interface 402 that provides a communication interface and processing functions for rendering video, graphics, images, and texts on the display 301, provides a set of built-in controls (such as buttons, text and lists), and supports diverse screen sizes; a keyboard interface 404 that provides a communication interface to the keyboard 302; a pointing device interface 405 that provides a communication interface to the pointing device 304; an antenna interface 406 that provides a communication interface to the antenna 305; a network connection interface 407 that provides a communication interface to a network over the computer network connection 306; a camera interface 408 that provides a communication interface and processing functions for capturing digital images from the camera 307; a sound interface 409 that provides a communication interface for converting sound into electrical signals using the microphone 309 and for converting electrical signals into sound using the speaker 310; a random access memory (RAM) 410 where computer instructions and data are stored in a volatile memory device for processing by the CPU 401; a read-only memory (ROM) 411 where invariant low-level systems code or data for basic system functions such as basic input and output (I/O), startup, or reception of keystrokes from the keyboard 302 are stored in a non-volatile memory device; a storage medium 412 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 414, application programs 415 (including, for example, a web browser application, a widget or gadget engine, and or other applications, as necessary) and data files 416 are stored; a navigation module 417 that provides a real-world or relative position or geographic location of the device 300; a power source 419 that provides an appropriate alternating current (AC) or direct current (DC) to power components; and a telephony subsystem 420 that allows the device 300 to transmit and receive sound over a telephone network. The constituent devices and the CPU 401 communicate with each other over a bus 421.

The CPU 401 can be one of a number of computer processors. In one arrangement, the computer CPU 401 is more than one processing unit. The RAM 410 interfaces with the computer bus 421 so as to provide quick RAM storage to the CPU 401 during the execution of software programs such as the operating system application programs, and device drivers. More specifically, the CPU 401 loads computer-executable process steps from the storage medium 412 or other media into a field of the RAM 410 in order to execute software programs. Data is stored in the RAM 410, where the data is accessed by the computer CPU 401 during execution. In one example configuration, the device 300 includes at least 128 MB of RAM, and 256 MB of flash memory.

The storage medium 412 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300, or to upload data onto the device 300.

A computer program product is tangibly embodied in storage medium 412, a machine-readable storage medium. The computer program product includes instructions that, when read by a machine, operate to cause a data processing apparatus to store image data in the mobile device. In some embodiments, the computer program product includes instructions that cause a data processing apparatus to launch and, if necessary, install an application based on user selection of a content item in a webpage.

The operating system 414 may be a LINUX-based operating system such as a mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 414 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 414, and the application programs 415 such as an email, instant messaging, a video service application, a mapping application word processing, spreadsheet, presentation, gaming, mapping, web browsing, JAVASCRIPT engine, or other applications. For example, one implementation may allow a user to access the GMAIL email application, an instant messaging application, a video service application, a mapping application, or an imaging editing and presentation application. The application programs 415 may also include a widget or gadget engine, such as a TAFRI™ widget engine, a MICROSOFT gadget engine such as the WINDOWS SIDE-BAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for launching and, if necessary, installing an application based on user selection of a content item in a webpage using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 417 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 417 may also be used to measure angular displacement, orientation, or velocity of the device 300, such as by using one or more accelerometers.

Figure 5:
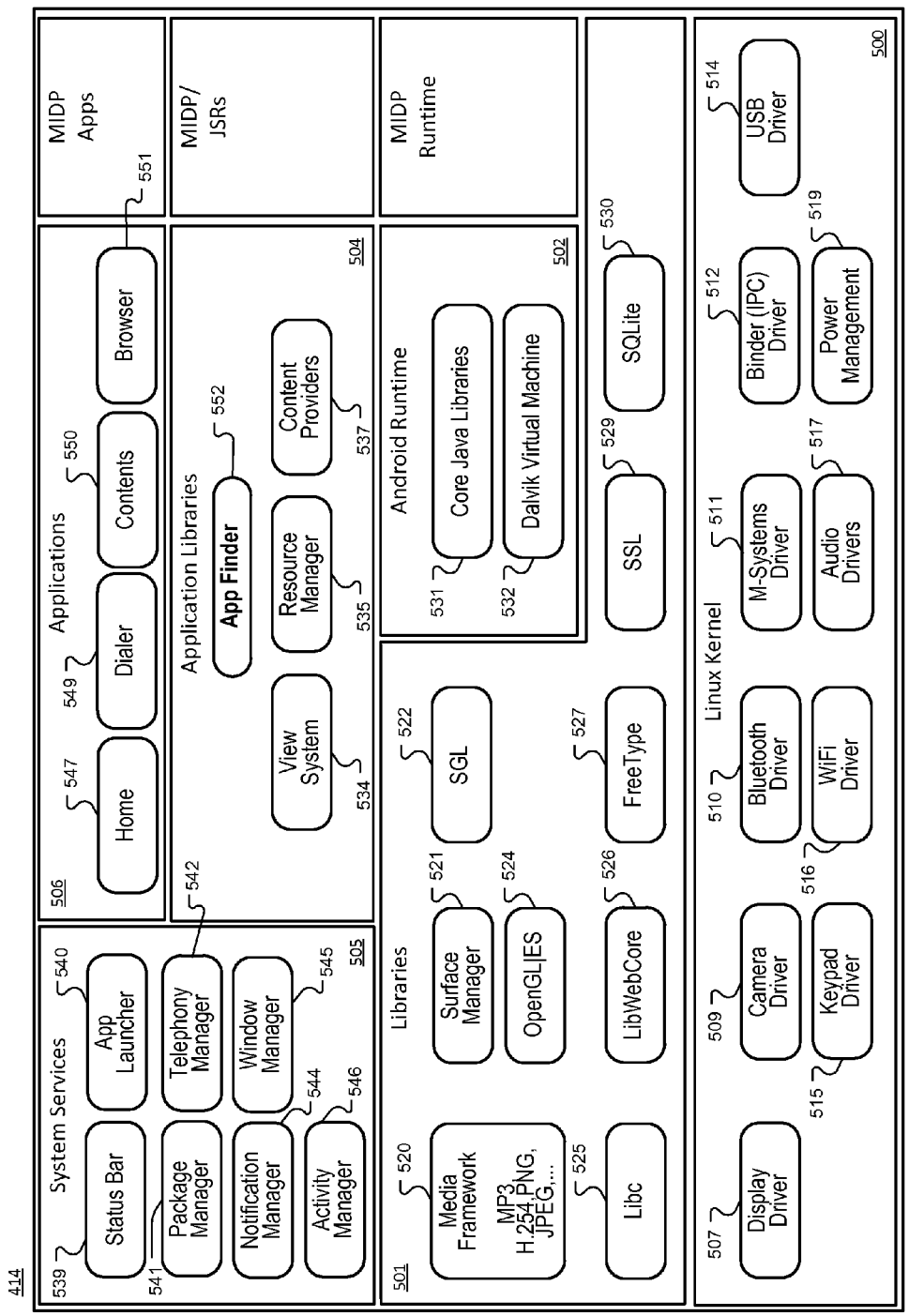
FIG. 5 is a block diagram illustrating exemplary components of the operating system used by the device of FIG. 3.

FIG. 5 is a block diagram illustrating exemplary components of the operating system 414 used by the device 300, in the case where the operating system 414 is a mobile device platform. The operating system 414 invokes multiple processes, while ensuring that the associated phone application is responsive, and that wayward applications do not cause a fault (or "crash") of the operating system. Using task switching, the operating system 414 allows for the switching of applications while on a telephone call, without losing the state of each associated application. The operating system 414 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 414 can generally be organized into six components: a kernel 500, libraries 501, an operating system runtime 502, application libraries 504, system services 505, and applications 506. The kernel 500 includes a display driver 507 that allows software such as the operating system 414 and the application programs 415 to interact with the display 301 via the display interface 402, a camera driver 509 that allows the software to interact with the camera 307; a BLUETOOTH driver 510; a M-Systems driver 511; a binder (IPC) driver 512, a USB driver 514 a keypad driver 515 that allows the software to interact with the keyboard 302 via the keyboard interface 404; a WiFi driver 516; audio drivers 517 that allow the software to interact with the microphone 309 and the speaker 310 via the sound interface 409; and a power management component 519 that allows the software to interact with and manage the power source 519.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 501 include a media framework 520 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 521; a simple graphics library (SGL) 522 for two-dimensional application drawing; an Open Graphics Library for Embedded Systems (OpenGL ES) 524 for gaming and three-dimensional rendering; a C standard library (LIBC) 525; a LIBWEBCORE library 526; a FreeType library 527; an SSL 529; and an SQLite library 530.

The operating system runtime 502 includes core JAVA libraries 531, and a Dalvik virtual machine 532. The Dalvik virtual machine 532 is a custom, virtual machine that runs a customized file format (.DEX).

The operating system 414 can also include Mobile Information Device Profile (MIDP) components such as the MIDP JAVA Specification Requests (JSRs) components, MIDP runtime, and MIDP applications as shown in FIG. 5. The MIDP components can support MIDP applications running on the device 300.

With regard to graphics rendering, a system-wide composer manages surfaces and a frame buffer and handles window transitions, using the OpenGL ES 524 and two-dimensional hardware accelerators for its compositions.

The Dalvik virtual machine 532 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 504 include a view system 534, a resource manager 535, content providers 537, and application finder 552. The system services 505 includes a status bar 539; an application launcher 540; a package manager 541 that maintains information for all installed applications; a telephony manager 542 that provides an application level JAVA interface to the telephony subsystem 420; a notification manager 544 that allows all applications access to the status bar and on-screen notifications; a window manager 545 that allows multiple applications with multiple windows to share the display 301; and an activity manager 546 that runs each application in a separate process, manages an application life cycle, and maintains a cross-application history.

The applications 506 include a home application 547, a dialer application 549, a contacts application 550, and a browser application 551.

The telephony manager 542 provides event notifications (such as phone state, network state, Subscriber Identity Module (SIM) status, or voicemail status), allows access to state information (such as network information, SIM information, or voicemail presence), initiates calls, and queries and controls the call state. The browser application 551 renders web pages in a full, desktop-like manager, including navigation functions. Furthermore, the browser application 551 allows single column, small screen rendering, and provides for the embedding of HTML views into other applications.

Figure 6:
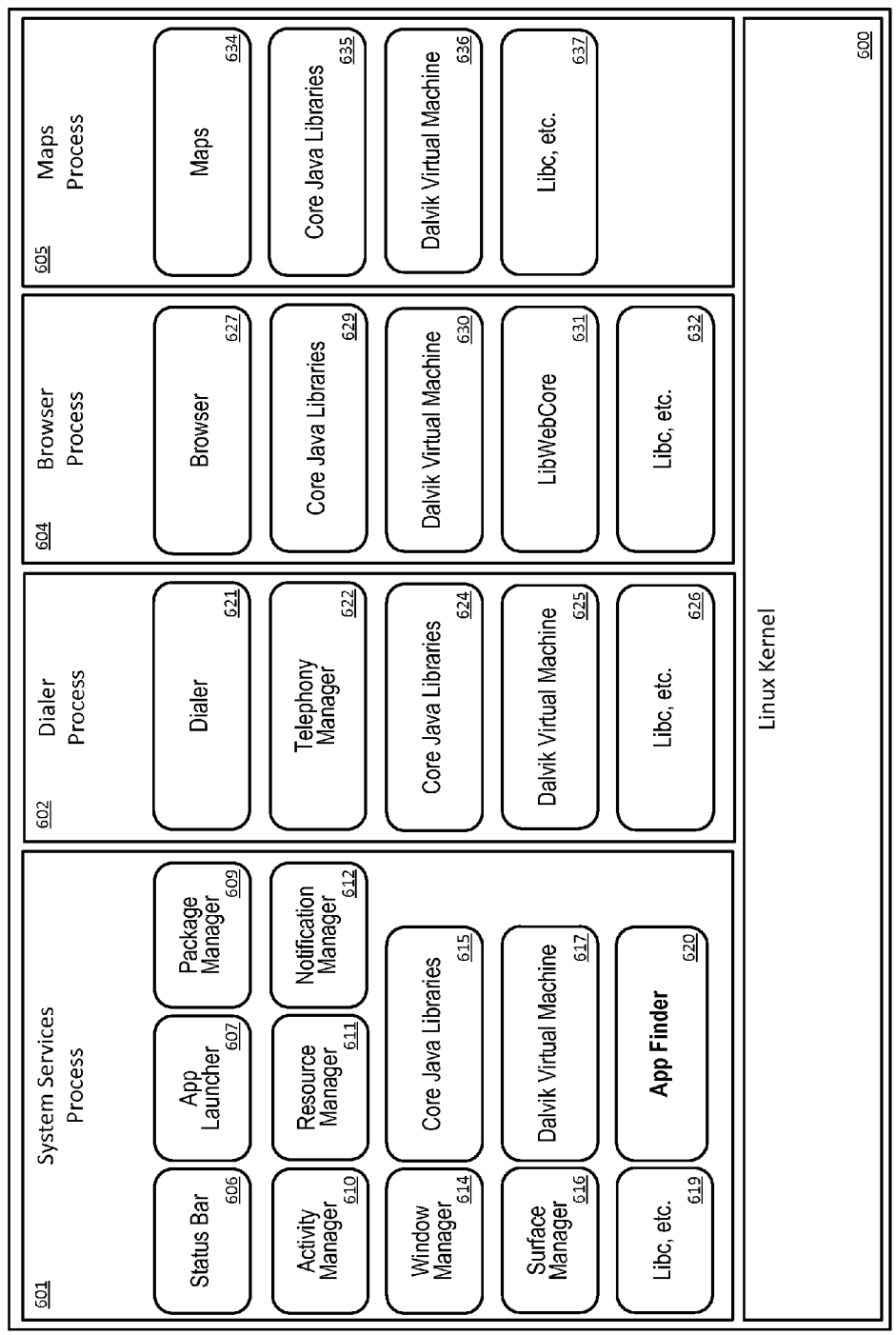
FIG. 6 is a block diagram illustrating exemplary processes implemented by the operating system kernel of FIG. 5.

FIG. 6 is a block diagram illustrating exemplary processes implemented by the operating system kernel 600. Generally, applications and system services run in separate processes, where the activity manager 546 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 616, the window manager 614, or the activity manager 610 can be continuously executed while the device 300 is powered. Additionally, some application-specific process can also be persistent. For example, processes associated with the dialer application 621, may also be persistent.

The processes implemented by the operating system kernel 600 may generally be categorized as system services processes 601, dialer processes 602, browser processes 604, and maps processes 605. The system services processes 601 include status bar processes 606 associated with the status bar 539; application launcher processes 607 associated with the application launcher 540; package manager processes 609 associated with the package manager 541; activity manager processes 610 associated with the activity manager 546; resource manager processes 611 associated with a resource manager 611 that provides access to graphics, localized strings, and XML layout descriptions; notification manger processes 612 associated with the notification manager 544; window manager processes 614 associated with the window manager 545; core JAVA libraries processes 615 associated with the core JAVA libraries 531; surface manager processes 616 associated with the surface manager 521; Dalvik virtual machine processes 617 associated with the Dalvik virtual machine 532, LIBC processes 619 associated with the LIBC library 525; and application finder processes 620 associated with the application finder application library 552.

The dialer processes 602 include dialer application processes 621 associated with the dialer application 549; telephony manager processes 622 associated with the telephony manager 542; core JAVA libraries processes 624 associated with the core JAVA libraries 531; Dalvik virtual machine processes 625 associated with the Dalvik Virtual machine 532; and LIBC processes 626 associated with the LIBC library 525. The browser processes 604 include browser application processes 627 associated with the browser application 551; core JAVA libraries processes 629 associated with the core JAVA libraries 531; Dalvik virtual machine processes 630 associated with the Dalvik virtual machine 532; LIBWEBCORE processes 631 associated with the LIBWEBCORE library 526; and LIBC processes 632 associated with the LIBC library 525.

The maps processes 605 include maps application processes 634, core JAVA libraries processes 635, Dalvik virtual machine processes 636, and LIBC processes 637. Notably, some processes, such as the Dalvik virtual machine processes, may exist within one or more of the systems services processes 601, the dialer processes 602, the browser processes 604, and the maps processes 605.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, an application finder module may be implemented as part of a client application on a user device (e.g., mobile device 300) for interfacing with application vendor servers. In some implementations, an application finder module may be implemented as part of an application launcher system service (e.g., application launcher 540) on a user device (e.g., mobile device 300).

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (for example, to a city, zip code, or state level), so that a particular location of the user cannot be determined.

The processes described herein and variations thereof contain functionality to ensure that party privacy is protected. Likewise, the processes may be programmed to confirm that information about a party is publicly known before divulging that information to another party even before incorporating that information into a social graph.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method performed by one or more processors of a user device, the method comprising:
sending a request for a content item by a first application running on the user device;
receiving, the content item comprising a uniform resource locator (URL), wherein the URL comprises a first appended data element that identifies a second application different than the first application, a second appended data element that identifies a product, and a third appended data element that comprises a conversion parameter;
displaying the content item by the first application;
receiving a user selection of a portion of the displayed content item, the portion displaying an indication of the product;
automatically checking, in response to receiving the user selection, if the second application is installed on the user device;
generating a formatted URL for the content item based on adding one or more additional data elements associated with the content item to the URL, the formatted URL linking to a specific landing page responsive to determining the second application is not installed on the user device;
transmitting a request to a server, using the formatted URL, wherein the request comprises at least the first appended data element;
installing the second application identified by the first appended data element on the user device;
launching the second application, based on using at least the second appended data element and the third appended data element as input parameters to the second application, so that a first content displayed by the second application relates to the product; and
transmitting data indicating purchase of the product using the second application to a conversion tracking server.

2. The method of claim 1, further comprising:
completing a purchase transaction for the product by the second application.

3. The method of claim 1, further comprising:
transmitting conversion tracking information responsive to installation of the second application to the conversion tracking server.

4. The method of claim 1, wherein a value of the conversion parameter comprises an address for a server that maintains a conversion log.

5. The method of claim 1, wherein the URL comprises a fourth appended data element that identifies a minimum version for the application.

6. The method of claim 5, further comprising checking if an installed version of the second application is older than the minimum version for the second application.

7. The method of claim 1, wherein the second appended data element is stored in a message queue for applications until the second application is launched.

8. The method of claim 1, wherein the server provides download of applications.

9. The method of claim 1, wherein the server redirects the request to a second server that provides download of applications.

10. The method of claim 1, wherein the second application is automatically launched after installation.

11. The method of claim 1, further comprising:
displaying icons for a plurality of applications that are configured to process the second appended data element; and
receiving a user selection of the second application from the plurality of applications.

12. The method of claim 1, further comprising:
preventing applications not matching the first appended data element from processing the second appended data element.

13. A computer-implemented method performed by a data processing apparatus, the method comprising:
transmitting, by a data processing apparatus, a content item comprising a URL, the URL comprising at least a first appended data element that identifies an application, a second appended data element that identifies a product, a third appended data element that comprises a Common Gateway Interface (CGI) parameter and a set of instructions, wherein the set of instructions, when executed by a user device in response to user selection of the content item, cause one or more processing devices to perform operations comprising:
automatically checking if the application is installed on the user device in response to receiving the user selection;
generating a formatted URL for the content item based on adding one or more additional data elements associated with the content item to the URL, the formatted URL linking to a specific landing page responsive to determining the application is not installed on the user device;
transmitting a request to a server, using the formatted URL, wherein the request comprises at least the first appended data element; and
launching, by the one or more processing devices, the application identified by the first appended data element, based on using at least the second appended data element and the third appended data element as input parameters to the application, so that a first content displayed by the application relates to the product; and
transmitting data indicating purchase of the product using the application to a conversion tracking server, the conversion tracking server identified by the CGI parameter.

14. The method of claim 13, wherein the set of instructions is a script.

15. The method of claim 13, wherein the operations further comprise transmitting conversion tracking information responsive to installation of the application to the conversion tracking server.

16. A system, comprising:
a data processing apparatus; and
one or more storage devices, coupled to the data processing apparatus, storing instructions which, when executed by the data processing apparatus cause the data processing apparatus to perform operations comprising:
sending a request for a content item by a first application running on a user device, the request comprising a size of the content item slot and media types that are available for presentation in the content item slot of the first application;
receiving the content item comprising content formatted for use in a content item slot and a URL, wherein the URL comprises a first appended data element that identifies a second application different than the first application, a second appended data element that identifies a product, and a third appended data element that comprises a conversion parameter;
displaying the content item in the content item slot by the first application;
receiving a user selection of a portion of the displayed content item, the portion displaying an indication of the product;
automatically checking, in response to receiving the user selection, if the second application is installed on the user device;
transmitting a request to a server, using the URL, wherein the request comprises at least the first appended data element responsive to not finding the second application installed on the user device;
receiving the application installation files for the second application responsive to transmitting the request to the server;
installing the second application on the user device;
launching the second application, based on using at least the second appended data element and the third appended data element as input parameters to the second application, so that a first content displayed by the second application relates to the product to streamline finding and purchasing the product; and
transmitting data indicating purchase of the product using the second application to a conversion tracking server, the conversion tracking server identified by the third appended data element.

17. The system of claim 16, in which the operations further comprise:
completing a purchase transaction for the product using the second application.

18. The system of claim 16, in which the operations further comprise:
transmitting conversion tracking information responsive to installation of the second application to the conversion tracking server.

19. The system of claim 16, wherein a value of the conversion parameter comprises an address for a server that maintains a conversion log.

20. The system of claim 16, wherein the URL comprises a fourth appended data element that identifies a minimum version for the second application.

21. The system of claim 20, in which the operations further comprise checking if an installed version of the second application is older than the minimum version for the second application.

22. The system of claim 16, wherein the second appended data element is stored in a message queue for applications until the second application is launched.

23. The system of claim 16, wherein the server provides download of applications.

24. The system of claim 16, wherein the server redirects the request to a second server that provides download of applications.

25. The system of claim 16, wherein the second application is automatically launched after installation.

26. The system of claim 16, in which the operations further comprise:
displaying icons for a plurality of applications that are configured to process the second appended data element; and
receiving a user selection of the second application from the plurality of applications.

27. The system of claim 16, in which the operations further comprise:
preventing applications not matching the first appended data element from processing the second appended data element.

28. A system, comprising:
a network interface configured to:
receive a content item comprising a URL, the URL comprising at least a first appended data element that identifies an application, a second appended data element that identifies a product, a third appended data element that comprises a conversion parameter, and a fourth appended data element that identifies a minimum required version of the application; and
transmit a request to a server, wherein the request comprises at least the first appended data element;
a display configured to display the content item;
a user interface configured to receive a user selection of a portion of the displayed content item, the portion displaying an indication of the product; and
one or more storage devices, storing instructions that are executable by one or more processing devices to perform operations comprising:
automatically checking, in response to receiving the user selection, if the application is installed on a user device and the version number of the application if installed;
generating a formatted URL for the content item based on adding one or more additional data elements associated with the content item to the URL, the formatted URL linking to a specific landing page responsive to determining the application is not installed on the user device or responsive to determining the minimum required version of the application is not installed on the user device, and the formatted URL being used for transmitting the request to the server;
installing the application identified by the first appended data element on the user device; launching the application, based on using at least the second appended data element and third appended data element as an input parameters to the application, so that a first content displayed by the application relates to the product; and
transmitting data indicating purchase of the product using the application to a conversion tracking server, the conversion tracking server identified by the third appended data element.

29. The system of claim 28, further comprising:
the user interface configured to allow a user to complete a purchase transaction for the product using the application.

30. The system of claim 28, further comprising:
a network interface configured to transmit conversion tracking information responsive to installation of the application to the conversion tracking server.

31. The system of claim 28, wherein the a value of the conversion parameter comprises an address for a server that maintains a conversion log.

32. The system of claim 28, wherein the URL comprises a fifth appended data element that identifies a recommended version for the application.

33. The system of claim 32, wherein the operations further comprise checking if an installed version of the application is older than the minimum required version for the application.

34. The system of claim 28, wherein the second appended data element is stored in a message queue for applications until the application is launched.

35. The system of claim 28, wherein the server provides download of applications.

36. The system of claim 28, wherein the server redirects the request to a second server that provides download of applications.

37. The system of claim 28, wherein the application is automatically launched after installation.

38. The system of claim 28, further comprising:
the display further configured to display icons for a plurality of applications that are configured to process the second appended data element; and the user interface further configured to receive a user selection of the application.

39. The system of claim 28, wherein the operations further comprise:
preventing applications not matching the first appended data element from processing the second appended data element.

40. A mobile device, comprising:
a wireless network interface configured to:
receive a content item comprising a URL, the URL comprising at least a first appended data element that identifies an application, a second appended data element that identifies a product, and a third appended data element that comprises a conversion parameter; and
transmit a request to a server, wherein the request comprises at least the first appended data element;
a display configured to a present the content item;
a user interface configured to receive a user selection of a portion of the displayed content item, the portion displaying an indication of the product; and
one or more storage devices, storing instructions that are executable by one or more processing devices to perform operations comprising:
automatically checking, in response to receiving the user selection, if the application is installed on a user device;
receiving a formatted URL for the content item, the formatted URL having been generated by adding one or more additional data elements associated with the content item to the URL, the formatted URL linking to a specific landing page and the formatted URL being used for transmitting the request to the server;
installing the application identified by the first appended data element on the user device if the application is not installed on the user device;
launching the application, based on using at least the second appended data element and third appended data element as an input parameters to the application, so that a first content displayed by the application relates to the product; and
transmitting data indicating purchase of the product using the second application to a conversion tracking server, the conversion tracking server identified by the third appended data element.

41. The mobile device of claim 40, wherein the user interface is further configured to allow a user to complete a purchase transaction for the product using the application.

42. The mobile device of claim 40, wherein the wireless network interface is further configured to transmit conversion tracking information responsive to installation of the application to the conversion tracking server.

43. The mobile device of claim 40, wherein the conversion parameter comprises an address for a server that maintains a conversion log.

44. The mobile device of claim 40, wherein the URL comprises a third appended data element that identifies a minimum version for the application.

45. The mobile device of claim 44, wherein the operations further comprise checking if an installed version of the application is older than the minimum version for the application.

46. The mobile device of claim 40, wherein the second appended data element is stored in a message queue for applications until the application is launched.

47. The mobile device of claim 40, wherein the server provides download of applications.

48. The mobile device of claim 40, wherein the server redirects the request to a second server that provides download of applications.

49. The mobile device of claim 40, wherein the application is automatically launched after installation.

50. The mobile device of claim 40, the display is further configured to display icons for a plurality of applications that are configured to process the second appended data element; and wherein the user interface is further configured to receive a user selection of the application.

51. The mobile device of claim 40, wherein the operations further comprise:
preventing applications not matching the first appended data element from processing the second appended data element.

52. A computer-readable storage medium storing software comprising instructions executable by a processing device that upon such execution cause the processing device to perform operations comprising:
sending a request for a content item by a first application running on a user device;
receiving the content item comprising a URL, the URL comprising at least a first appended data element that identifies a second application, a second appended data element that identifies a product, and a third appended data element that comprises a conversion parameter;
displaying the content item by the first application;
receiving a user selection of a portion of the displayed content item, the portion displaying an indication of the product;
automatically checking, in response to receiving the user selection, if the second application is installed on the user device;
generating a formatted URL for the content item based on adding one or more additional data elements associated with the content item to the URL, the formatted URL linking to a specific landing page responsive to determining the second application is not installed on the user device;
transmitting a request to a server, using the formatted URL, wherein the request comprises at least the first appended data element;
installing the second application identified by the first appended data element on the user device;
launching the second application, based on using at least the second appended data element and the third appended data element as input parameters to the second application, so that a first content displayed by the second application relates to the product; and
transmitting data indicating purchase of the product using the second application to a conversion tracking server, the conversion tracking server identified by the third appended data element.

53. The computer-readable storage medium of claim 52, in which the operations further comprise:
completing a purchase transaction for the product by the second application.

54. The computer-readable storage medium of claim 52, in which the operations further comprise:
    transmitting conversion tracking information responsive to installation of the second application to the conversion tracking server.
55. The computer-readable storage medium of claim 52, wherein the conversion parameter comprises an address for a server that maintains a conversion log.
56. The computer-readable storage medium of claim 52, wherein the URL comprises a third appended data element that identifies a minimum version for the application.
57. The computer-readable storage medium of claim 56, in which the operations further comprise checking if an installed version of the second application is older than the minimum version for the second application.
58. The computer-readable storage medium of claim 52, wherein the second appended data element is stored in a message queue for applications until the second application is launched.
59. The computer-readable storage medium of claim 52, wherein the server provides download of applications.
60. The computer-readable storage medium of claim 52, wherein the server redirects the request to a second server that provides download of applications.
61. The computer-readable storage medium of claim 52, wherein the second application is automatically launched after installation.
62. The computer-readable storage medium of claim 52, in which the operations further comprise:
    displaying icons for a plurality of applications that are configured to process the second appended data element; and
    receiving a user selection of the second application from the plurality of applications.
63. The computer-readable storage medium of claim 52, in which the operations further comprise:
    preventing applications not matching the first appended data element from processing the second appended data element.

* * * * *